(12) United States Patent
Cunado Landa et al.

(10) Patent No.: US 10,343,747 B2
(45) Date of Patent: Jul. 9, 2019

(54) ELECTRIC BICYCLE FRAME AND ELECTRIC BICYCLE

(71) Applicant: BH BIKES EUROPE, S.L., Vitoria (Alava) (ES)

(72) Inventors: Francisco Javier Cunado Landa, Vitoria (ES); Javier Beistegui Sagasti, Vitoria (ES)

(73) Assignee: BH BIKES EUROPE, S.L., Vitoria (Alava) (ES)

( * ) Notice: Subject to any disclaimer, the term of this patent is extended or adjusted under 35 U.S.C. 154(b) by 87 days.

(21) Appl. No.: 15/659,035

(22) Filed: Jul. 25, 2017

(65) Prior Publication Data

US 2018/0043966 A1 Feb. 15, 2018

(30) Foreign Application Priority Data

Aug. 10, 2016 (EP) .................................. 16380030

(51) Int. Cl.
*B62M 6/90* (2010.01)
*B62K 19/30* (2006.01)
*B62M 6/40* (2010.01)
*B62K 19/40* (2006.01)
*H01M 2/10* (2006.01)

(52) U.S. Cl.
CPC ............ *B62M 6/90* (2013.01); *B62K 19/30* (2013.01); *B62K 19/40* (2013.01); *B62M 6/40* (2013.01); *H01M 2/1083* (2013.01); *B62K 2204/00* (2013.01)

(58) Field of Classification Search
CPC ................................. B62M 6/55; B62M 6/90
See application file for complete search history.

(56) References Cited

U.S. PATENT DOCUMENTS

| 7,393,125 B1* | 7/2008 | Lai ........................... B62M 6/90 280/281.1 |
| 7,934,576 B2* | 5/2011 | Munksoe ............... B62K 11/00 180/220 |
| 8,727,367 B2* | 5/2014 | Talavasek .............. B62K 19/00 280/281.1 |
| 8,979,110 B2* | 3/2015 | Talavasek ................ B62M 6/90 280/279 |
| 9,611,003 B1* | 4/2017 | Yu ........................... B62M 6/90 |
| 9,902,457 B2* | 2/2018 | Hu ......................... B62K 19/30 |

(Continued)

FOREIGN PATENT DOCUMENTS

| CN | 203064153 U | 7/2013 |
| DE | 102013108313 A1 | 7/2014 |

(Continued)

OTHER PUBLICATIONS

European Search Report dated Feb. 17, 2017 for Application No. 16380030.3.

*Primary Examiner* — Kevin Hurley
(74) *Attorney, Agent, or Firm* — Lucas & Mercanti, LLP (57) ABSTRACT

The present invention relates to an electric bicycle frame and electric bicycle, the frame comprising a down tube with a housing defined therein into which an electric battery pack is inserted, the housing of the down tube having an insertion opening in its upper part for introducing the electric battery pack, such that the electric battery pack is concealed and protected inside the down tube of the frame with suitable accessibility for removal.

11 Claims, 8 Drawing Sheets

(56) References Cited

U.S. PATENT DOCUMENTS

| | | | |
|---|---|---|---|
| 2010/0062330 A1 | 3/2010 | Chen | |
| 2010/0175939 A1* | 7/2010 | Cheng | B60R 16/04 180/68.5 |
| 2016/0311494 A1* | 10/2016 | Schliewert | B62M 6/90 |
| 2017/0174095 A1* | 6/2017 | Shieh | B62K 19/40 |
| 2018/0269439 A1* | 9/2018 | Yoneda | B62J 9/001 |

FOREIGN PATENT DOCUMENTS

| | | | | |
|---|---|---|---|---|
| DE | 202018003330 U1 * | 8/2018 | | |
| EP | 2913261 A1 | 9/2015 | | |
| JP | 11059532 A * | 3/1999 | | B62M 6/90 |
| JP | H1159532 A | 3/1999 | | |
| JP | 2003154984 A | 5/2003 | | |
| WO | 99/26837 A1 | 6/1999 | | |
| WO | 03/022671 A2 | 3/2003 | | |
| WO | 2015039785 A1 | 3/2015 | | |

* cited by examiner

ELECTRIC BICYCLE FRAME AND ELECTRIC BICYCLE

CROSS-REFERENCE TO RELATED APPLICATION

This application claims the benefit of priority from European Patent Application No. 16380030.3 filed Aug. 10, 2016, which is incorporated herein by reference.

FIELD OF THE INVENTION

The present invention relates to the structural formation of electric bicycles and particularly to the mounting of an electric battery pack for powering a propulsion drive motor in these bicycles, proposing an arrangement for mounting the electric battery pack which improves the characteristics of electric bicycles.

BACKGROUND OF THE INVENTION

Electric bicycles are conventionally driven by means of an electric motor which is powered for operation by an electric battery incorporated in the structural assembly of the bicycle.

To that end, a common solution for incorporating the electric battery for powering the propulsion drive motor in electric bicycles is to hold the electric battery with a fastener of any type in an external position on the bicycle frame. This has the drawback of the electric battery being exposed to easy manipulations and theft by third parties, as well as to the harmful effects of atmospheric agents.

To eliminate this drawback, solutions of integrating the electric battery inside one of the elements making up the bicycle frame have been developed, such as the embodiment proposed in patent document WO03/022671, for example, in which an electric battery is arranged inside the down tube of the bicycle frame, so the electric battery is protected and concealed, overcoming the drawbacks of solutions in which the electric battery is arranged externally on the bicycles. Nevertheless, in this solution the electric battery is mounted in a fixed manner inside the down tube of the frame, which makes it difficult to dismount and replace the electric battery in the event of maintenance, and makes it necessary to take the entire bicycle to a charging connection in order to charge the electric battery. Furthermore, access to the electric battery is made through the lower part of the down tube of the frame, which makes it necessary to turn the bicycle upside down if access to the electric battery is required, with the subsequent structural damage the handlebar and saddle may experience in the process.

Patent document WO99/26837 proposes another solution for incorporating an electric battery inside the down tube of a bicycle frame, the electric battery being inserted through the lower part of the down tube of the frame which converges in the bottom bracket of the bicycle, wherein the housing of the electric battery is closed with a cap which is coupled in the opening of the housing. This solution makes it easier to remove the electric battery in order to take it to a charging connection point for charging, without having to move the bicycle to the charging site; however, it has the drawback that to establish the housing of the battery, the bottom bracket of the bicycle must be moved so that it is mounted in a position above or below the point at which the bars forming the bicycle frame converge, so the bottom bracket is mounted in a manner that is less resistant than in a conventional bicycle, in addition to the necessary structural modification of the bicycle for said mounting.

Additionally, since the housing of the electric battery in the lower part of the bicycle frame is sealed closed, it is also necessary to lift the bicycle or turn it upside down to remove the electric battery, with the subsequent difficulty and damage which the handlebar and saddle may experience in the removal process when the bicycle is turned upside down; furthermore, removal from the lower part requires disassembling the rear wheel damper in order to rotate it so that it does not interfere with the battery during the removal (in the case of a bicycle with rear suspension) or to make a geometry consisting of a long, unwieldy rear (in the case of a bicycle without rear suspension). On the other hand, if the sealing cap of the housing comes off while riding the bicycle, the electric battery can fall out and break, as well as cause an accident.

SUMMARY OF THE INVENTION

The invention proposes an electric bicycle frame with an improved solution for mounting the electric battery pack, having features which eliminate the drawbacks of conventional solutions, improving the functionality of the electric bicycle.

The electric bicycle frame object of the invention comprises a down tube with a housing defined therein into which the electric battery pack is inserted, wherein the housing of the down tube has an insertion opening in its upper part for introducing the electric battery pack.

The electric battery pack has a flange at its upper end for establishing a stop for stopping the insertion of the electric battery pack into the housing, such that when the electric battery pack is introduced in the housing said flange fits in a recess formed in an upper transverse bar of the frame, through which the opening for the electric battery pack to enter the housing is defined.

An arrangement is thereby obtained with which the electric battery pack is concealed and protected inside the down tube of the frame in which it is housed, and since the electric battery pack is introduced through the upper part of the bicycle in the housing of the down tube, there is no risk of the electric battery pack being able to come out of the housing accidentally and fall out when riding the bicycle, while at the same time having suitable accessibility to the electric battery pack to make the removal thereof easier.

On the other hand, since the opening of the housing of the electric battery pack is in the upper part of the bicycle, it is not necessary to lift the bicycle or turn it upside down in order to remove said electric battery pack, being able to perform such removal very easily in order to take the electric battery pack for charging, replacement or for performing any maintenance operation. Nevertheless, the electric battery pack can also be charged without being removed from the bicycle, such as in a conventional solution of a bicycle with a non-detachable electric battery.

To make it easier to remove the electric battery pack from and introduce it in the housing of the down tube, there has been envisaged at the upper end of the electric battery pack the incorporation of a manipulation lever, which is arranged in a pivoting assembly, being able to be lowered and housed in a cavity defined at the upper end itself of the electric battery pack when not in use. Consequently, and as a result of the fitting of the abutment flange of the upper end of the electric battery pack in the recess of the upper transverse bar of the bicycle frame, with the electric battery pack mounted, a perfect appearance of the bicycle frame is maintained.

As a result of the foregoing, the mounting arrangement object of the invention has very advantageous features both for the functionality and for the appearance of the bicycle, such arrangement being novel and preferred with respect to conventional arrangements having the same application.

DETAILED DESCRIPTION OF THE INVENTION

Figure 1:
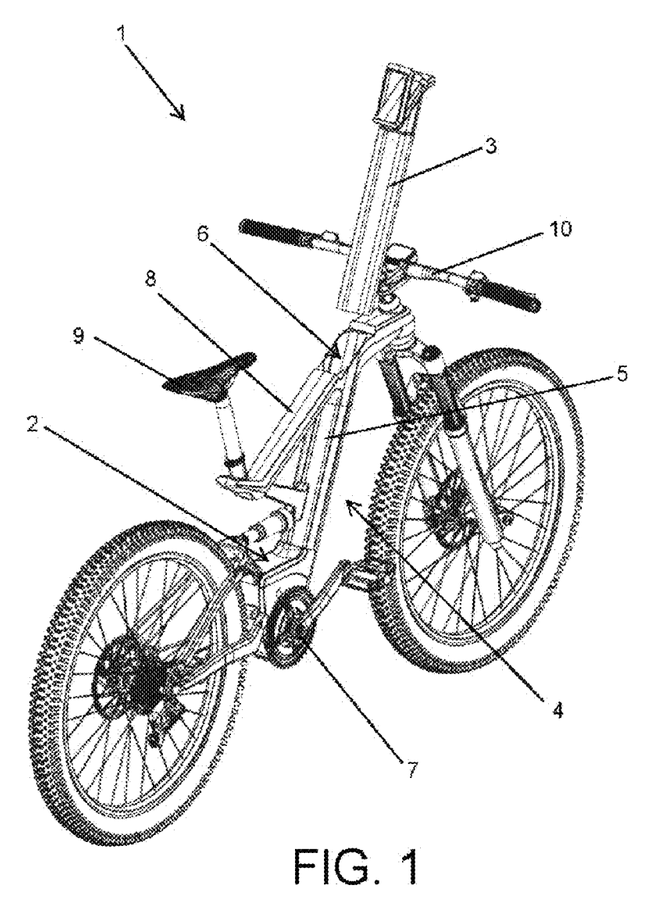
FIG. 1 shows a perspective view of an electric bicycle with a frame according to the invention housing an electric battery pack which can be inserted through the upper part of the down tube of the bicycle frame.

FIG. 1 shows an electric bicycle (1) with an electric motor (2) for the propulsion of the bicycle which is powered through an electric battery pack (3).

The bicycle (1) comprises a frame (4) which, according to the invention, has a down tube (5) inside which there is defined a housing (6) into which the electric battery pack (3) is inserted. The electric motor (2) together with the bottom bracket (7) of the bicycle (1) are arranged at the lower end of the down tube (5), whereas at the upper end the down tube (5) has an insertion opening for introducing the electric battery pack (3) in the housing (6).

As shown in the drawings, the electric battery pack (3) is inserted into the housing (6) of the down tube (5) through an upper transverse bar (8) of the frame (4) of the bicycle (1), which incorporates at one end a saddle (9) while it has at the opposite end an assembly of stem and handlebar (10) of the bicycle (1), the upper transverse bar (8) being connected with the down tube (5) through the end incorporating a saddle (9) to provide rigidity to the frame (4).

The electric battery pack (3) has at the upper end a flange (11) which acts as a stop for stopping the insertion of said electric battery pack (3) into the housing (6), said flange (11) fitting in a recess (12) of the upper transverse bar (8) of the frame (4) when the electric battery pack (3) is fully inserted in the mounting position in the housing (6), so the incorporation of the electric battery pack (3) does not change the appearance of the frame (4) of the bicycle (1).

That being the case, the electric battery pack (3) can be easily removed by simply pulling it upwards without having to lift the bicycle (1) or turn it upside down in order to take said electric battery pack (3) to charge it electrically, to replace it, or to perform any maintenance operation required; this does not exclude the fact that electrical charging can also be performed through a charging port (19) with the electric battery pack (3) incorporated in the bicycle (1), when so desired.

Figure 2:
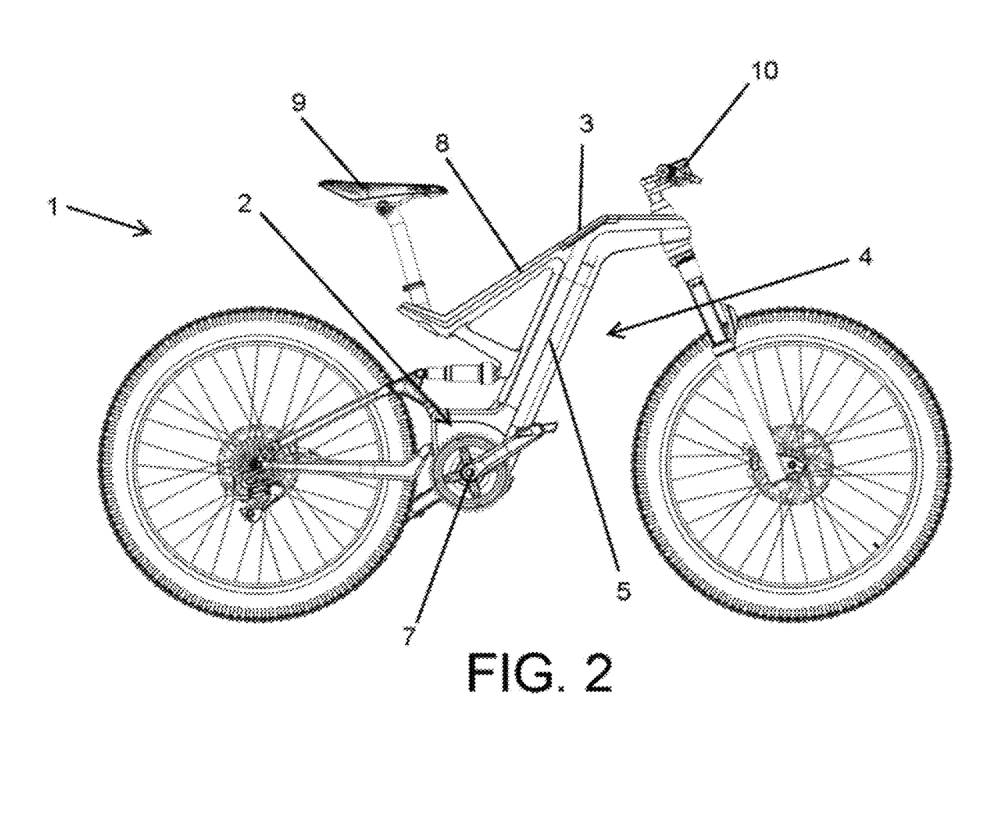
FIG. 2 is a side view of the electric bicycle with the electric battery pack housed in the frame.
Figure 3:
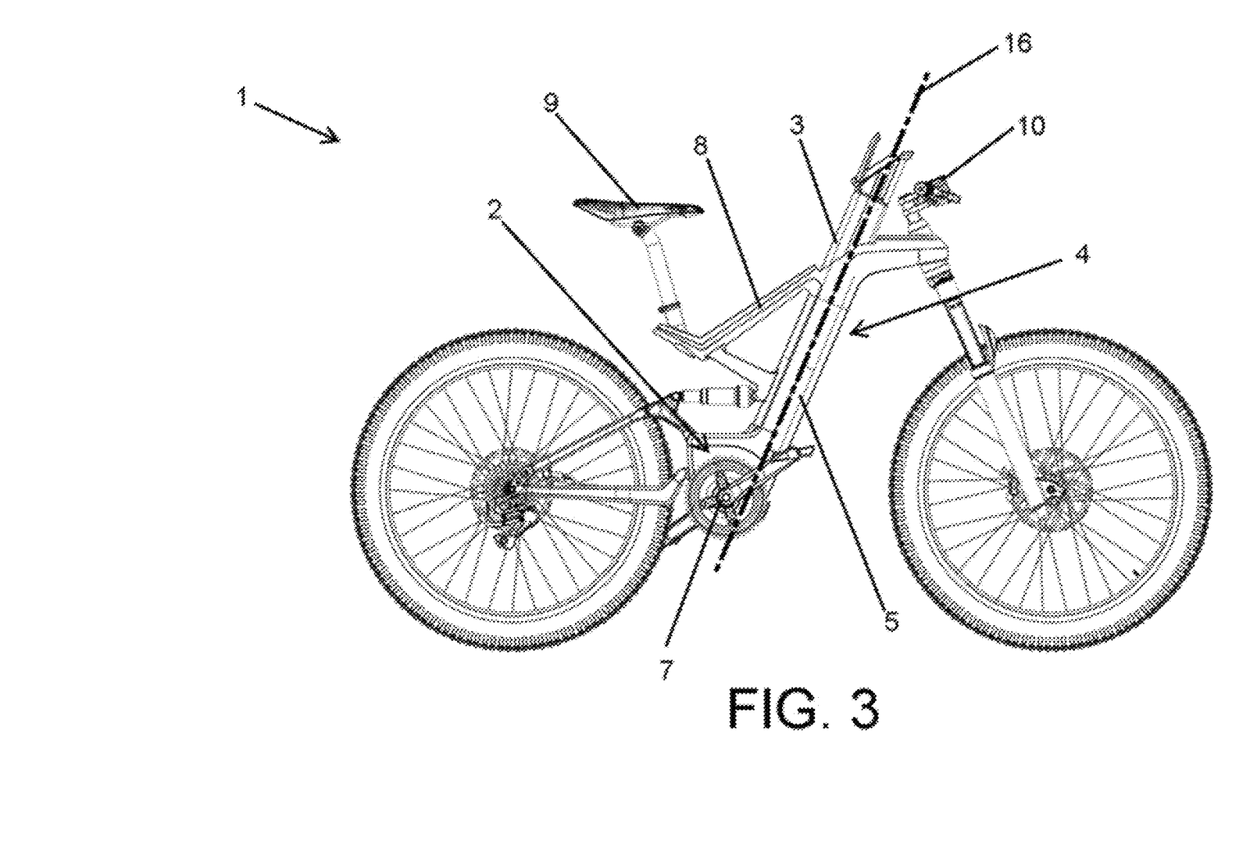
FIG. 3 is a view like the preceding one, with the electric battery pack partially introduced in the housing of the down tube of the bicycle frame.

To make it easier to remove the electric battery pack (3) from and to insert it into the housing (6) of the down tube (5) of the bicycle (1), there is envisaged at the upper end of the electric battery pack (3) the incorporation of a lever (13), which is incorporated in a pivoting assembly, being able to be lowered when not in use such that it fits in a corresponding cavity (14) defined in the electric battery pack (3) itself, as seen in FIG. 2, or being able to be lifted to manipulate the electric battery pack (3), as seen in FIG. 3.

The electric battery pack (3) has at its lower end a plug-in connector (15) for establishing an electrical connection with a connector of the electric motor (3), such that in addition to establishing the electrical connection, said plug-in connector (15) also assures the retention of the electric battery pack (3) so that it does not accidentally come out of the housing (6) of the down tube (5) as a result of the bicycle (1) bouncing during use. Nevertheless, to better assure the retention of the electric battery pack (3) in the housing (6), the possibility of using locking means, which can have a key or combination lock, is envisaged to prevent the electric battery pack (3) from being removed or stolen by third parties.

Figure 6:
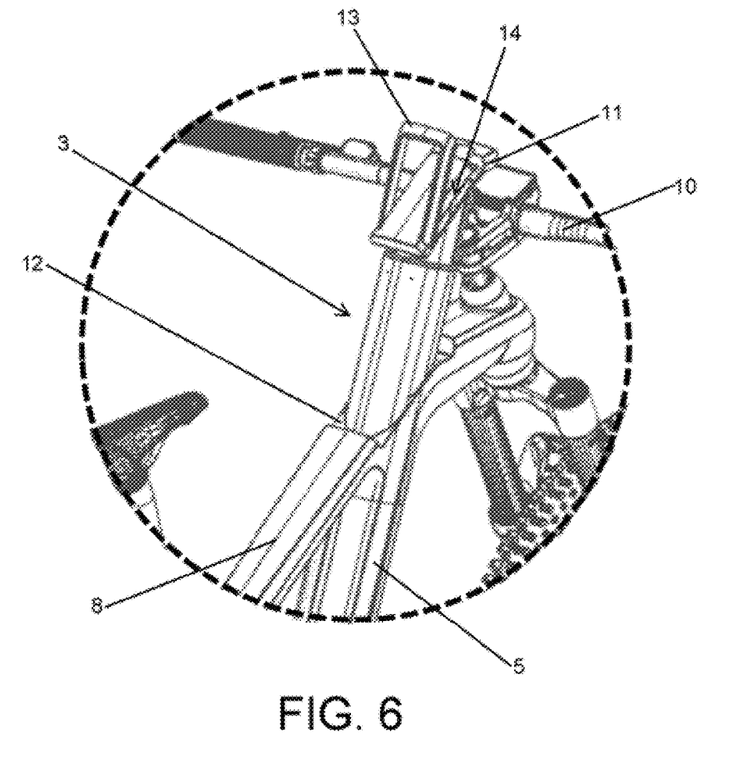
FIG. 6 is a perspective view of a detail of the area for inserting the electric battery pack into the housing of the down tube, with the electric battery pack partially removed.
Figure 7:
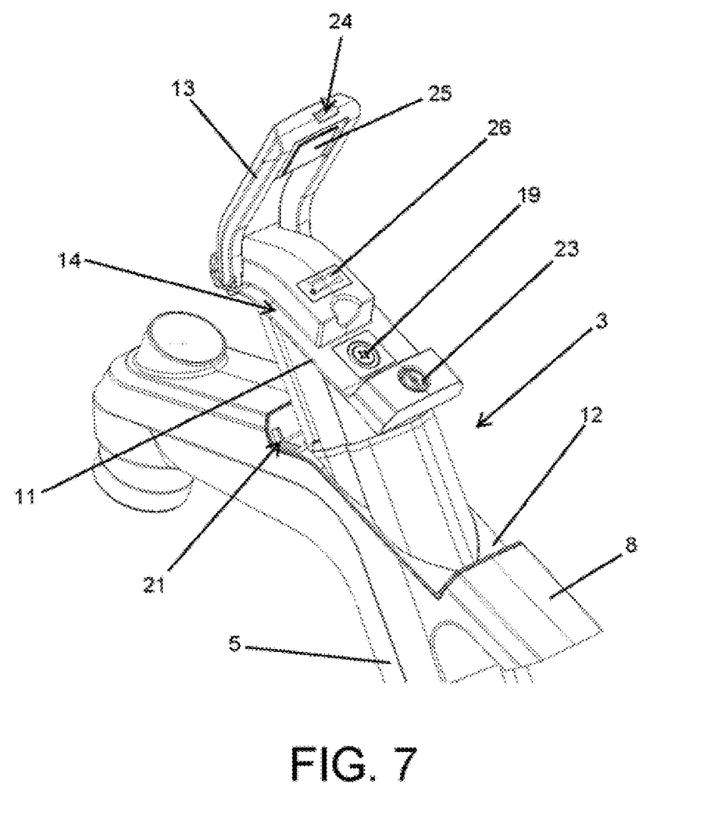
FIGS. 7 and 8 show an embodiment of the frame with locking means for locking the electric battery pack in the housing of the down tube of the bicycle frame.
Figure 8:
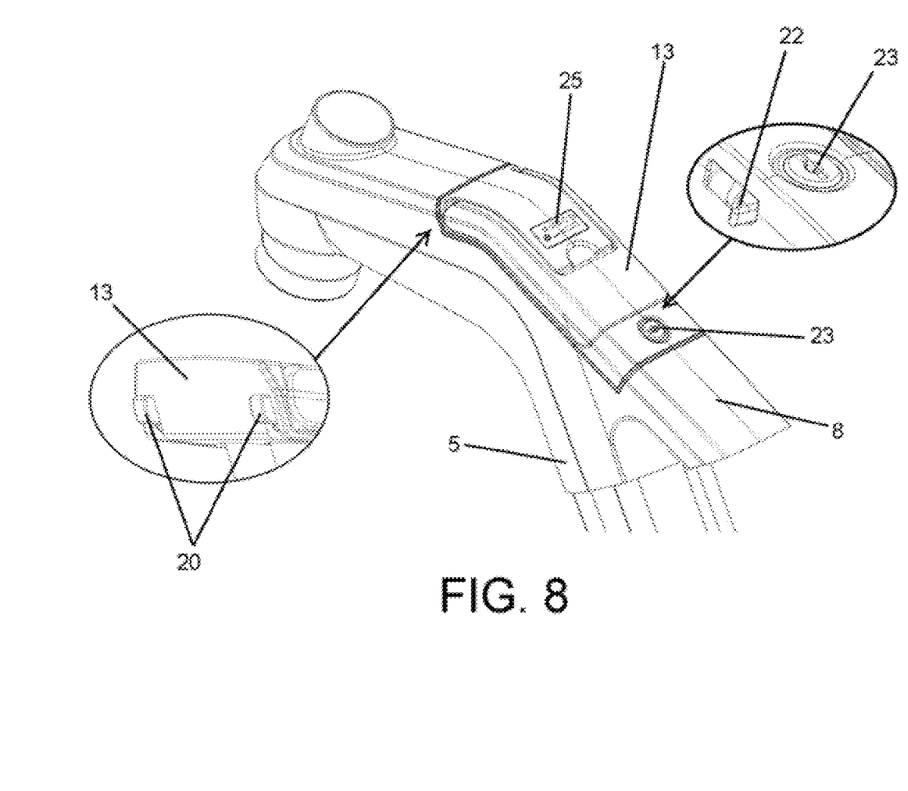

As shown in FIGS. 6 and 7, the locking means comprise anchoring catches (20) associated with the axis of rotation of the lever (13) which fit in reciprocal housings (21) of the down tube (5), and a closure tab (22) operated by means of a lock (23) which fits in a reciprocal housing (24) of the lever (13). Therefore in the closed position of the lever (13), when it is housed in its cavity (14), the closure tab (22) is introduced in the housing (24), preventing manipulation of the lever (13), whereas the anchoring catches (20) are introduced in the reciprocal housings (21), preventing removal of the electric battery pack (3) from the housing (6) of the down tube (5). Therefore, in addition to assuring the retention of the electric battery pack (3) in its housing (6), access to the charging port (19) is prevented, whereby it is only accessible when the lever (13) is unblocked.

It has been envisaged that the lever (13) has a protective film (25) made of neoprene or a similar material to protect and seal the charging port (19) when the lever (13) is in the closed position. On the other hand, the electric battery pack (3) has a charge level indicator (26) arranged in full view in the upper part of the electric battery pack (3).

To prevent the actual configuration of the frame (4) of the bicycle (1) from making it difficult to insert the electric battery pack (3) into and to remove it from the housing (6), the down tube (5) in which said housing (6) is arranged is established such that the mentioned opening of the housing (6) is in a position far enough away from any structural element which may make it difficult to insert and remove the electric battery pack (3). Specifically, the down tube (5) of the bicycle frame (2) has a more vertical inclination than the down tube of conventional bicycle frames, such that, as seen in detail in FIG. 3, the longitudinal axis (16) of the down tube (5) is shifted with respect to the handlebar (10) of the bicycle (1), such that during the removal of the electric battery pack (3), the latter does not interfere with the handlebar (10).

Figure 4:
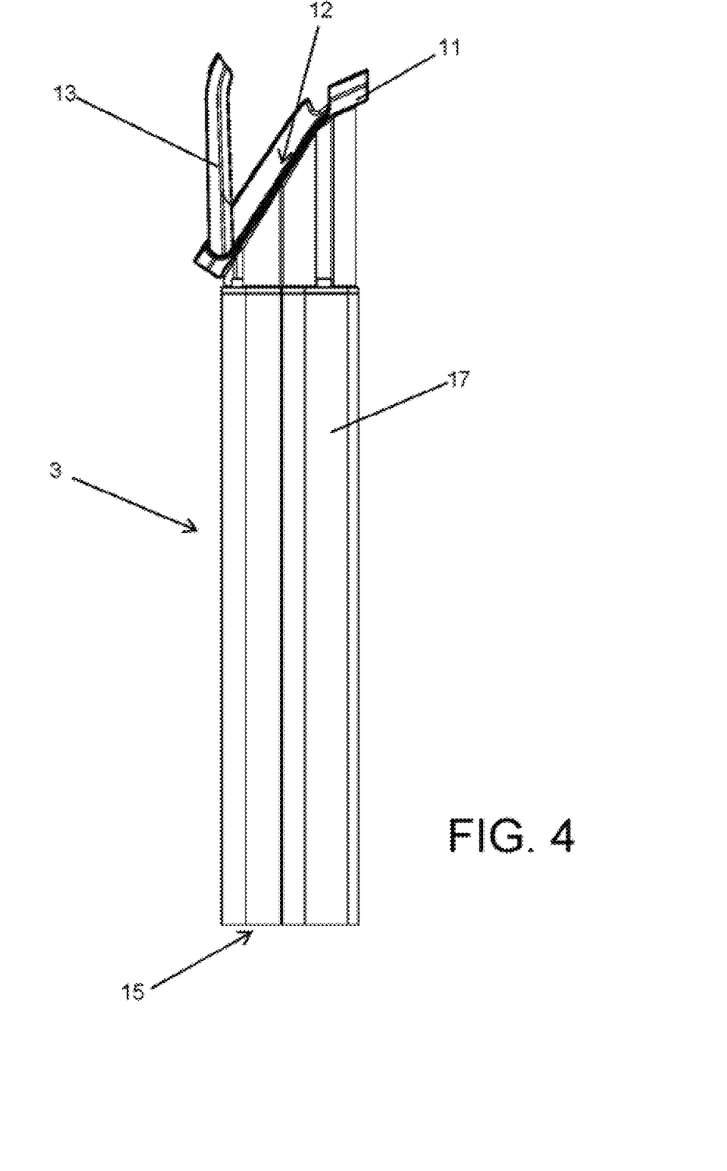
FIG. 4 shows a side view of the electric battery pack which is inserted into the electric bicycle frame.
Figure 5:
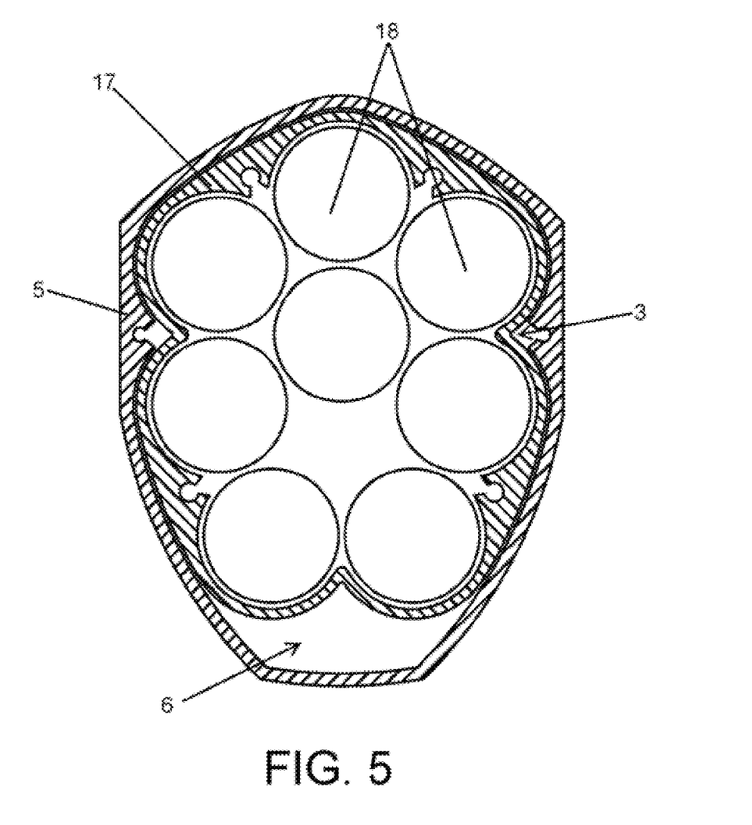
FIG. 5 shows a cross section of the down tube of the bicycle frame with the electric battery pack housed therein.

As seen in FIGS. 4 and 5, the electric battery pack (3) comprises an outer casing (17) in which batteries (18) are housed, forming a closed block with a high electrical capacity for powering the electric motor (2) of the bicycle (1); the inclusion of the electric battery pack (3) inside the down tube (5) of the frame (4) of the bicycle (1) being established. The batteries (18) are therefore protected by the casing (17), so the user of the bicycle (1) can safely manipulate the electric battery pack (3).

The invention claimed is:

1. An electric bicycle frame, comprising:
a down tube with a housing defined therein into which an electric battery pack is inserted, wherein the housing has an upper part comprising an insertion opening adapted to receive the electric battery pack; and
an upper transverse bar having a first end and a second end opposite the first end;
wherein:
the insertion opening for inserting the electric battery pack into the housing is formed through the upper transverse bar;
the upper transverse bar incorporates a saddle at the first end and, at the second end, an assembly comprising a stem and a handlebar; and
a longitudinal axis of the down tube is shifted with respect to the handlebar, to allow insertion of the electric battery pack into, and removable of the electric battery pack from, the housing of the down tube without interference by the handlebar.

2. The electric bicycle frame according to claim 1, wherein the electric battery pack has a flange at its upper end for establishing a stop for stopping the insertion of the electric battery pack into the housing.

3. The electric bicycle frame according to claim 2, wherein the insertion opening for inserting the electric battery pack into the housing is established through an upper transverse bar of the frame of the bicycle, which has a recess in which the flange is fitted when the electric battery pack is introduced in the housing.

4. The electric bicycle frame according to claim 1, wherein a longitudinal axis of the down tube of the frame is shifted with respect to a handlebar of the bicycle such that it allows introducing the electric battery pack into and removing it from the housing of the down tube without interfering with the handlebar.

5. The electric bicycle frame according to claim 1, wherein the electric battery pack has at its upper end a manipulation lever arranged in a pivoting assembly, being able to be lowered into a cavity of the electric battery pack itself when said lever is in a closed position.

6. An electric bicycle frame, comprising a down tube with a housing defined therein into which an electric battery pack is inserted, wherein the housing of the down tube has an insertion opening in its upper part for introducing the electric battery pack,
wherein the frame has locking means for retaining the electric battery pack in the housing, wherein the locking means comprise anchoring catches associated with the axis of rotation of a lever which fit in reciprocal housings of the down tube, and a closure tab which fits in a reciprocal housing of the lever.

7. The electric bicycle frame according to claim 1, wherein the electric battery pack comprises an outer casing in which batteries are housed.

8. An electric bicycle frame, comprising a down tube with a housing defined therein into which an electric battery pack is inserted, wherein the housing of the down tube has an insertion opening in its upper part for introducing the electric battery pack,
wherein the electric battery pack has at its upper end a manipulation lever arranged in a pivoting assembly, being able to be lowered into a cavity of the electric battery pack when said lever is in a closed position,
wherein the electric battery pack has in its upper part a charging port which is covered by a protective film arranged in the lever when the lever is in the closed position.

9. An electric bicycle incorporating a frame according to claim 1.

10. The electric bicycle frame according to claim 6, wherein the electric battery pack has in its upper part a charging port which is covered by a protective film arranged in the lever when the lever is in the closed position.

11. An electric bicycle frame, comprising a down tube with a housing defined therein into which an electric battery pack is inserted, wherein the housing of the down tube has an insertion opening in its upper part for introducing the electric battery pack,
wherein the electric battery pack comprises an outer casing in which batteries are housed,
wherein the electric battery pack has in its upper part a charging port which is covered by a protective film arranged in a lever when the lever is in the closed position.

* * * * *